(12) United States Patent
Mahmood et al.

(10) Patent No.: US 12,556,239 B2
(45) Date of Patent: Feb. 17, 2026

(54) MASSIVE MULTIPLE-INPUT MULTIPLE-OUTPUT (mMIMO) BEAMFORMING ESTIMATOR

(71) Applicant: MAXLINEAR, INC., Carlsbad, CA (US)

(72) Inventors: Zohaib Mahmood, Westwood, MA (US); Hajir Roozbehani, Waltham, MA (US); Alexandre Megretski, Acton, MA (US); Yan Li, Lexington, MA (US)

(73) Assignee: MAXLINEAR, INC., Carlsbad, CA (US)

( * ) Notice: Subject to any disclaimer, the term of this patent is extended or adjusted under 35 U.S.C. 154(b) by 40 days.

(21) Appl. No.: 18/589,407

(22) Filed: Feb. 27, 2024

(65) Prior Publication Data

US 2024/0291526 A1 Aug. 29, 2024

Related U.S. Application Data

(60) Provisional application No. 63/487,257, filed on Feb. 27, 2023.

(51) Int. Cl.
*H04B 7/0426* (2017.01)
*H04B 7/0452* (2017.01)
(Continued)

(52) U.S. Cl.
CPC ............ *H04B 7/043* (2013.01); *H04B 7/0452* (2013.01); *H04L 5/0048* (2013.01); *H04L 25/0202* (2013.01)

(58) Field of Classification Search
CPC .... H04B 7/043; H04B 7/0452; H04B 7/0617; H04L 5/0048; H04L 25/0202
See application file for complete search history.

(56) References Cited

U.S. PATENT DOCUMENTS

| 10,547,426 B2* | 1/2020 | Papasakellariou .... H04L 5/0053 |
| 2018/0115912 A1 | 4/2018 | Gao et al. |

(Continued)

FOREIGN PATENT DOCUMENTS

| WO | 2019138156 A1 | 7/2019 |
| WO | 2021234739 A1 | 11/2021 |
| WO | 2022232079 A1 | 11/2022 |

OTHER PUBLICATIONS

International Search Report and Written Opinion for International Application No. PCT/US2024/017573, dated Jul. 29, 2024, 17 pages.

(Continued)

*Primary Examiner* — Vineeta S Panwalkar
(74) *Attorney, Agent, or Firm* — Buchalter; Jason W. Croft (57) ABSTRACT

According to an example, a massive multiple-input multiple-output (mMIMO) system operable for beamforming actuation may comprise an open radio access network radio unit (O-RU) having a processing device operable to: compute one or more of a predictive channel estimate, a beamforming estimate, or an antenna calibration; compute, based on an objective function having one or more of the predictive channel estimate, the beamforming estimate, or the antenna calibration as inputs, a power level for a data stream associated with a transmitting antenna path, wherein the power level for the data stream is selected to facilitate an equal-power distribution across a plurality of transmitting antenna paths; and set the power level for the data stream associated with the transmitting antenna path.

12 Claims, 7 Drawing Sheets

(51) Int. Cl.
*H04L 5/00* (2006.01)
*H04L 25/02* (2006.01)

(56) References Cited

U.S. PATENT DOCUMENTS

| | | |
|---|---|---|
| 2019/0386727 A1 | 12/2019 | Jeon et al. |
| 2021/0320698 A1 | 10/2021 | Sharafat et al. |
| 2022/0052881 A1 | 2/2022 | Guo et al. |
| 2022/0278714 A1 | 9/2022 | Tsui |

OTHER PUBLICATIONS

Kobayashi M., et al., "Joint Beamforming and Scheduling for a Multi-Antenna Downlink with Imperfect Transmitter Channel Knowledge", IEEE Journal on Selected Areas in Communications, vol. 25, No. 7, Sep. 2007, pp. 1468-1477.

* cited by examiner

MASSIVE MULTIPLE-INPUT MULTIPLE-OUTPUT (mMIMO) BEAMFORMING ESTIMATOR

RELATED APPLICATION

This application claims the benefit of U.S. Provisional Application No. 63/487,257, filed Feb. 27, 2023, the disclosure of which is incorporated herein by reference in its entirety.

The examples discussed in the present disclosure are related to beamforming estimation and actuation.

BACKGROUND

Unless otherwise indicated herein, the materials described herein are not prior art to the claims in the present application and are not admitted to be prior art by inclusion in this section.

Beamforming is a signal processing technique used for directional signal transmission. There are different variants of beamforming including analog, digital, and hybrid beamforming, two-dimensional beamforming, three-dimensional beamforming (as used in multiple input multiple output (MIMO)), and the like. Beamforming may be used to achieve spatial selectivity in different wireless communication standards including 5G and IEEE 802.11ac and beyond.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

A massive multiple-input multiple-output (mMIMO) system operable for beamforming actuation may include an open radio access network radio unit (O-RU) having a processing device. The processing device may be operable to compute one or more of a predictive channel estimate, a beamforming estimate, or an antenna calibration. The processing device may be operable to compute, based on an objective function having one or more of the predictive channel estimate, the beamforming estimate, or the antenna calibration as inputs, a power level for a data stream associated with a transmitting antenna path. The power level for the data stream may be selected to facilitate an equal-power distribution across a plurality of transmitting antenna paths. The processing device may be operable to set the power level for the data stream associated with the transmitting antenna path.

An mMIMO system including an open radio access network radio unit (O-RU) may include a processing device operable to compute an initial predictive channel estimate. The processing device may be operable to compute an initial beamforming estimate using the initial predictive channel estimate. The processing device may be operable to compute an initial antenna calibration using a reciprocity measurement received from a reference signal. The processing device may be operable to output a joint beamforming estimate based on an objective function having the initial predictive channel estimate, the initial beamforming estimate, and the initial antenna calibration as inputs. The processing device may be operable to send the joint beamforming estimate to a beamforming actuator for transmission.

The objects and advantages of the examples will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Examples will be described and explained with additional specificity and detail through the use of the accompanying drawings in which.

DESCRIPTION OF EMBODIMENTS

Massive multiple input multiple output (mMIMO) technology uses multiple antennas to enhance spectral efficiency which may result in increased network coverage, network capacity, and user equipment (UE) throughput. Multiple antennas may increase network coverage and capacity using beamforming, null forming, and spatial multiplexing. Beamforming may increase signal quality by focusing gain. Spatial multiplexing may increase data throughput by using parallel data streams. Null forming may reduce interference by avoiding specific directions.

Massive MIMO includes one or more mMIMO radios and features. A mMIMO implementation may be deployed by applying multiple antenna techniques based on knowledge about a channel to enhance network coverage, capacity, and throughput. Radio parameters (such as the number of RF chains, the output power, the bandwidth, and the number of bands) and antenna element parameters (such as the size and structure of the antenna) may play a role in deployment of mMIMO.

Implementing beamforming in a mMIMO system may depend on several factors that may differ based on beamforming estimation, channel estimation, and antenna calibration. For a time division duplex (TDD) network, antenna calibration may be performed using reciprocity because the frequency bands for the (UL) uplink and (DL) downlink directions may use the same frequency range. Channel estimation may depend on the availability of a suitable reference signal such as a channel state information reference signal (CSI-RS), a sounding reference signal (SRS), or the like. Beamforming estimation may depend on the type of algorithm used in estimation.

Balancing these factors may provide performance results that may not consider other factors. For example, when beamforming estimation, channel estimation, and antenna calibration are optimized without considering their interdependence, the network coverage, capacity, and throughput may be reduced relative to capacity. That is, discrete computations for each of the beamforming estimation, the channel estimation, and antenna calibration may not provide overall performance results that are efficient (e.g., with respect to power). Therefore, disclosures that address the interdependence between beamforming estimation, channel estimation, and antenna calibration may provide an enhancement in overall system power efficiency which can further enhance network capacity, coverage, and throughput.

In some examples, a mMIMO system may be operable for predictive channel estimation, beamforming estimation, or antenna calibration. The mMIMO system may include an open radio access network radio unit (O-RU) having a processing device. The processing device may be operable to compute one or more of a predictive channel estimate, an antenna calibration, or a beamforming estimate. The processing device may be operable to compute, based on an objective function having one or more of the predictive channel estimate, the antenna calibration, or the beamforming estimate as inputs, a power level for a data stream associated with a transmitting antenna path. The power level for the data stream may be selected to facilitate an equal-power distribution across a plurality of transmitting antenna paths. The processing device may be operable to set the power level for the data stream associated with the transmitting antenna path.

In some examples, a mMIMO system may be operable for beamforming actuation comprising an O-RU having a processing device. The processing device may be operable to compute: (i) an initial predictive channel estimate, (ii) an initial beamforming estimate using the predictive channel estimate, and (iii) an initial antenna calibration using a reciprocity measurement received from a reference signal. The processing device may be operable to output a joint beamforming estimate based on an objective function having the initial predictive channel estimate, the initial beamforming estimate, and the initial antenna calibration as inputs. The processing device may be operable to send the joint beamforming estimate to a beamforming actuator for transmission.

Figure 1:
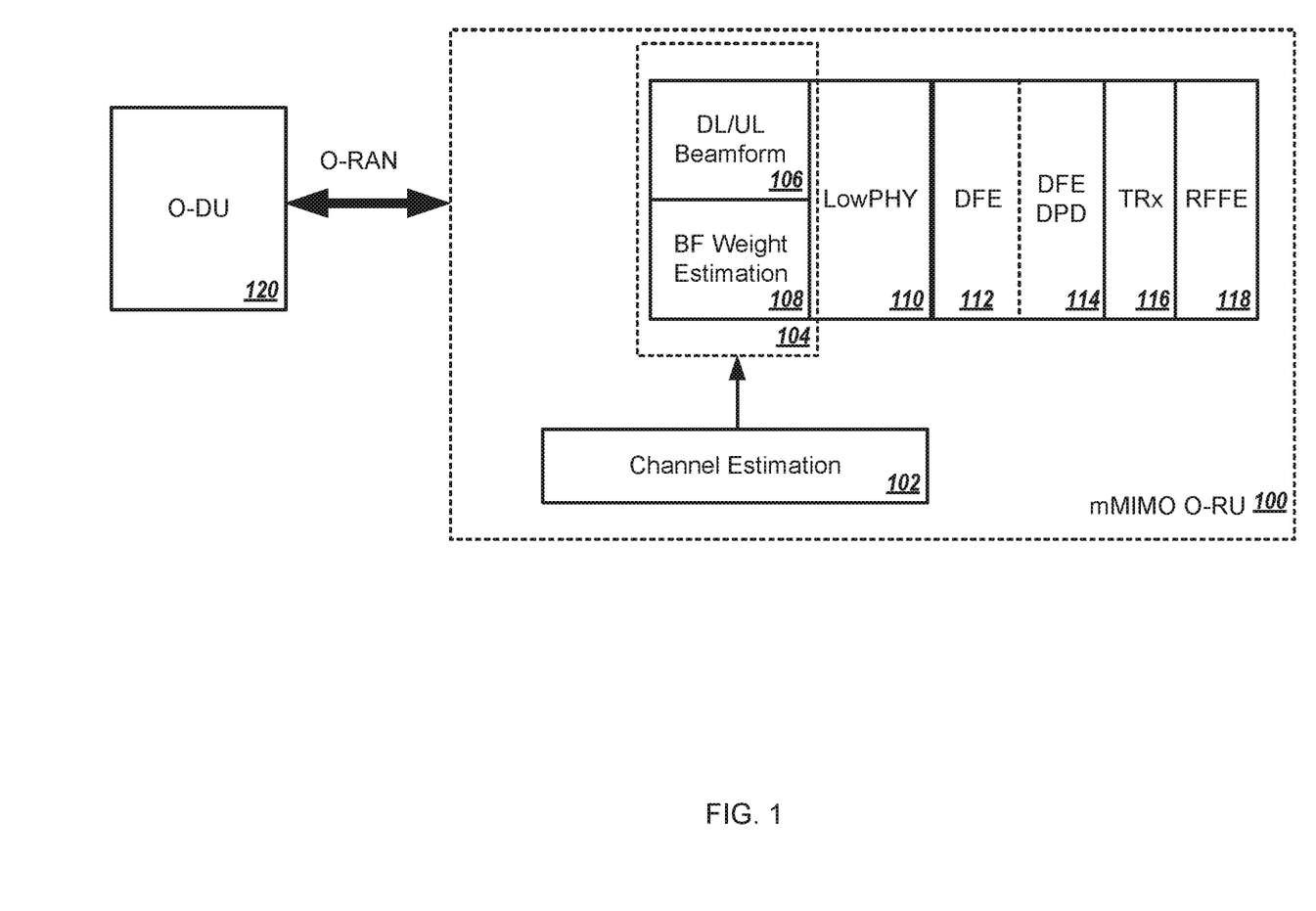
FIG. 1 illustrates a block diagram of an example communication system operable to perform beamforming.

In some examples, as illustrated in FIG. 1, a base station (BS) may be operable in an open radio access network (O-RAN). The BS may include a massive multiple-input multiple-output (mMIMO) O-RAN radio unit (O-RU) 100 and a mMIMO O-RAN distributed unit (O-DU) 120. The mMIMO O-RU 100 may include one or more logical blocks including: channel estimation 102, beamforming 104 comprising downlink/uplink (DL/UL) beamforming 106 and beamforming weight estimation 108, lowPHY 110, digital front end (DFE) 112, digital front end digital pre-distortion (DFE DPD) 114, transmission/receiving (TRx) 116, radio frequency front end (RFFE) 118, or the like. The O-RU 100 may be operable to interface with the O-DU 120.

In some examples, a predictive channel estimate may be computed in the channel estimation 102 block and a beamforming estimate may be computed in the beamforming 104 block. The predictive channel estimate and the beamforming 104 estimate may be used as inputs to an objective function that may be constrained by power constraint. The power constraint may facilitate a substantially equal power distribution across a plurality of transmitting paths. The power distribution across the plurality of transmitting paths may be substantially equal when the variance of the power for the transmitting paths is below a selected threshold. The selected threshold may be less than one or more of 10%, 5%, 4%, 3%, 1%, or the like.

In some examples, a power constraint may be used to adjust the power level by maximizing one or more signal ratios (e.g., signal to noise ratio (SNR), signal to interference plus noise ratio (SINR), the like, or a combination thereof) for an $i^{th}$ UE and a $j^{th}$ layer using the objective function:

$$\text{maximize} \sum_{i \le k} \log(SINR_i + 1)$$

subject to the constraints:

$$D_i H_i \sum W_j = I \forall\, i \le k$$

$$\left|\sum e_i' W_j\right|^2 \le \frac{1}{n} \forall\, i \le n$$

where W is the precoding matrix, D is the decoding matrix, H is the channel, I is the identity matrix, W is the decoding matrix, $e_k$ is a unit row basis vector, and n is the number of transmit antenna paths. That is, the third term may adjust for the power constraint. In one example, a solution may be computed using local maxima calculated using gradient descent.

In some examples, the objective function as subject to the power constraint, may be used to compute power levels for data streams associated with the transmitting antenna paths. In one example, a processing device may be operable to set a power level for data streams associated with the transmitting antenna paths. In one example, the power levels may be computed using an iterative operation. Using iterative operations may enhance the speed of the computation and reduce the computational complexity. In one example, iteration may reduce the computation time by greater than one more of: 10%, 20%, 30%, 40%, 50%, 60%, 70%, or 80% compared to the computation time when iteration is not used.

In some examples, the predictive channel estimate may be computed using data compression to reduce data bandwidth below a data bandwidth threshold and reduce signal processing time below a signal processing time threshold. In one example, data compression may reduce the data bandwidth by greater than one or more of: 10%, 20%, 30%, 40%, 50%, 60%, 70%, or 80% compared to the data bandwidth when data compression is not used. In one example, data compression may reduce the signal processing time by greater than one or more of: 10%, 20%, 30%, 40%, 50%, 60%, 70%, or 80%, 90% compared to the signal processing time when data compression is not used.

In some examples, the processing device may be operable to compute the beamforming estimate based on the predictive channel estimate. In some examples, the predictive channel estimate may be compressed prior to computing the beamforming estimate to reduce the computation time for the beamforming estimate. In one example, compression may reduce the computation time for the beamforming estimate by greater than one or more of: 10%, 20%, 30%, 40%, 50%, 60%, 70%, or 80%, 90% compared to the computation time for beamforming estimation when data compression is not used.

In some examples, the transmitting antenna path may include one or more of: a LowPHY 110 layer, a DFE 112, a DFE DPD 114, a TRx 116, or an RFFE 118. The transmitting antenna path may further include a power amplifier (not shown). In some examples, the transmitting antenna path may have a power efficiency greater than a selected power efficiency threshold. In some examples, the plurality of transmitting antenna paths may have a total power efficiency greater than a total power efficiency threshold.

In some examples, the mMIMO system may include an open radio access network distributed unit (O-DU) that may be split from the O-RU based on an O-RU 6 split or an O-RU 7 split. In some examples, the mMIMO system may include an open radio access network distributed unit (O-DU) that may be split from the O-RU based an O-RU 7.2 split, as shown in FIG. 1. In some examples, the mMIMO system may include an open radio access network distributed unit (O-DU) that may be split from the O-RU based an O-RU 7.2C split, as shown in FIGS. 2 and 3.

Figure 2:
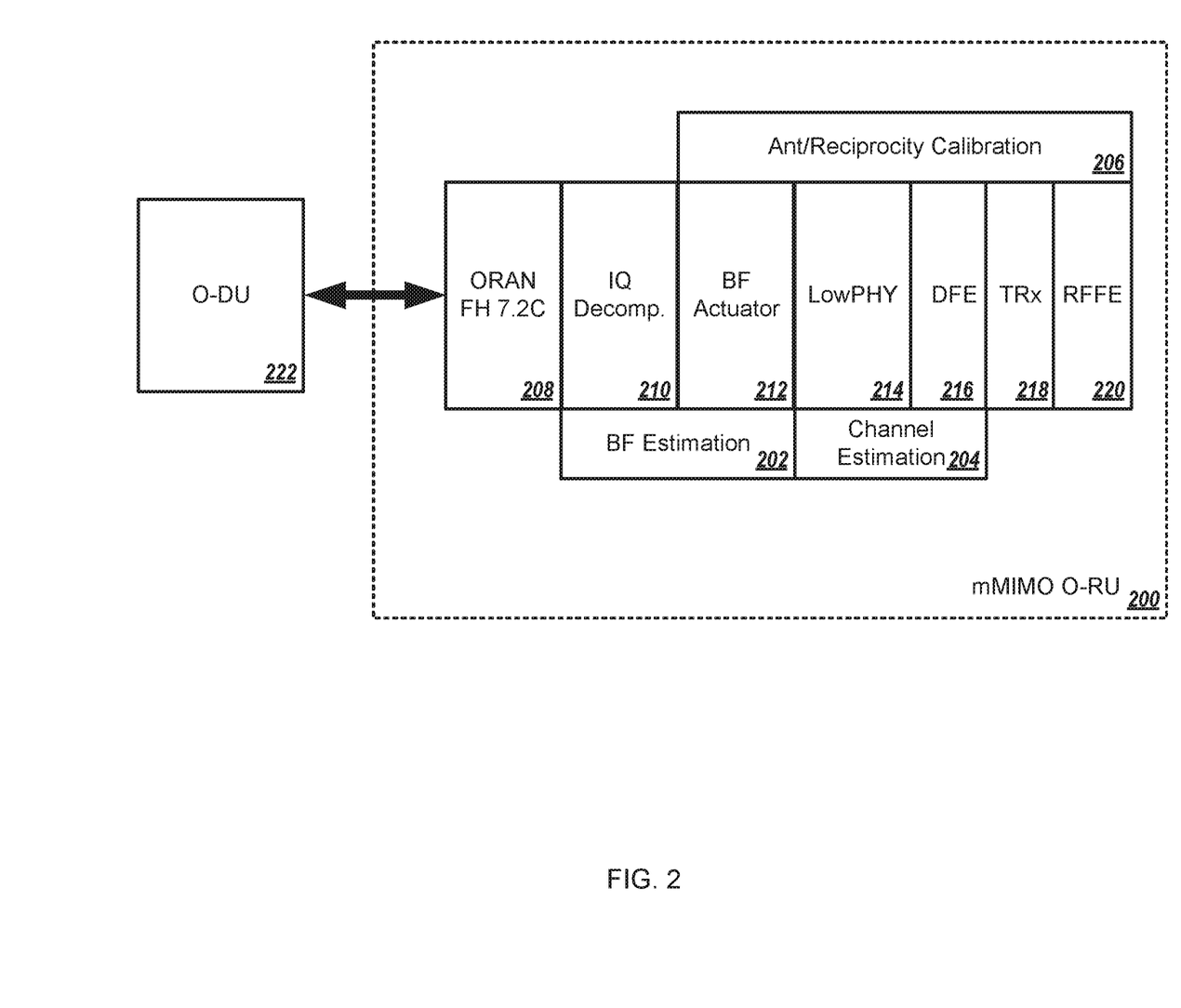
FIG. 2 illustrates a block diagram of another example communication system operable to perform beamforming.
Figure 3:
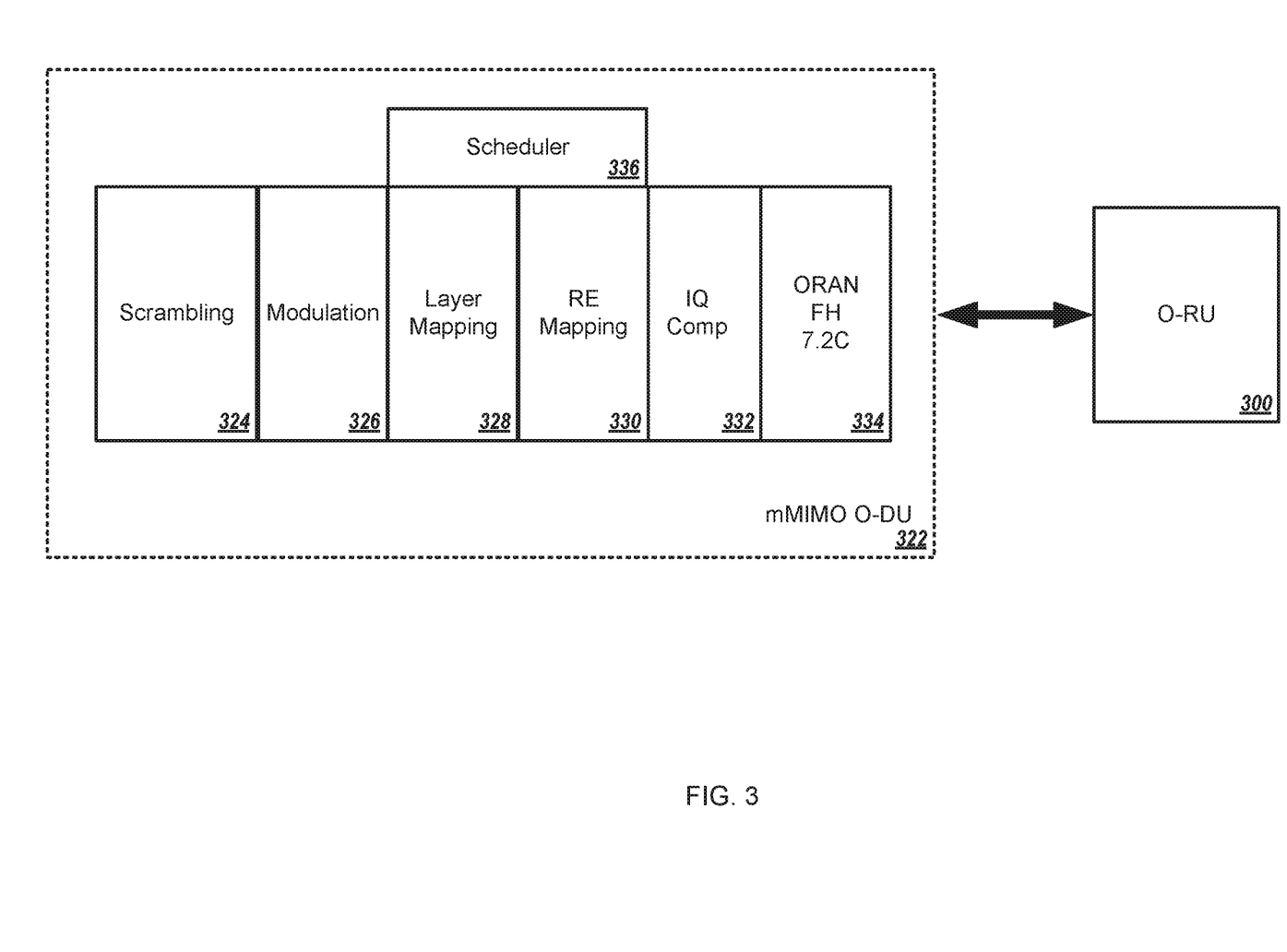
FIG. 3 illustrates a block diagram of another example communication system operable to perform beamforming.

In some examples, as illustrated in FIG. 2, a BS may be operable in an O-RAN. The BS may include an O-RU 200 and an O-DU 222. The mMIMO O-RU 200 may include one or more modules including: beamforming estimation 202, channel estimation 204, antenna/reciprocity calibration 206, O-RAN front-haul 7.2C 208, IQ decomposition 210, beamforming actuation 212, lowPHY 214, DFE 216, TRx 218, RFFE 220, or the like. The O-RU 200 may be operable to interface with the O-DU 222 (e.g., as described in FIG. 3, O-DU 322).

In some examples, the mMIMO system, may include an O-RU 200 that may include a processing device. The processing device may be operable for beamforming estimation 202, channel estimation 204, and antenna/reciprocity calibration 206. Channel estimation 204 may be operable to compute an initial predictive channel estimate. Beamforming estimation 202 may be operable to compute an initial beamforming estimation using the initial predictive channel estimate. Antenna/reciprocity calibration 206 may be operable to compute an initial antenna calibration using a reciprocity measurement received from a reference signal. Beamforming estimation 202 may be operable to output a joint beamforming estimate based on an objective function having the initial predictive channel estimate, the initial beamforming estimate, and the initial antenna calibration as inputs. The joint beamforming estimate may be sent to the beamforming actuator 212 for further processing and subsequent transmission.

In some examples, the processing device may be operable to subject the objective function to a power constraint as otherwise disclosed herein. In one example, the processing device may be operable to compute the joint beamforming estimate using iteration to reduce the computation time as otherwise disclosed herein. In one example, the processing device may be operable to compress the initial predictive channel estimate before computing the initial beamforming estimate as otherwise disclosed herein.

In some examples, the processing device may be operable to compute an antenna/reciprocity calibration 206. In one example, the antenna/reciprocity calibration 206 may be computed using a reciprocity measurement received from a reference signal. The reference signal may be any suitable reference signal including one or more of: a CSI-RS, an SRS, a demodulation reference signal (DM-RS), a phase tracking reference signal (PTRS), or the like. In some examples, the antenna/reciprocity calibration 206 may be used as an input to the objective function and the power constraints.

In some examples, as illustrated in FIG. 3, a BS may be operable in an O-RAN. The BS may include an O-RU 300 and an O-DU 322. The mMIMO O-DU 322 may include one or more modules including: scrambling 324, modulation 326, layer mapping 328, resource element (RE) mapping 330, IQ compression 332, O-RAN fronthaul (FH) 7.2C 334, scheduler 336, or the like. The O-DU 322 may be operable to interface with the O-RU 300 (e.g., as described in FIG. 2, O-RU 200).

Figure 4:
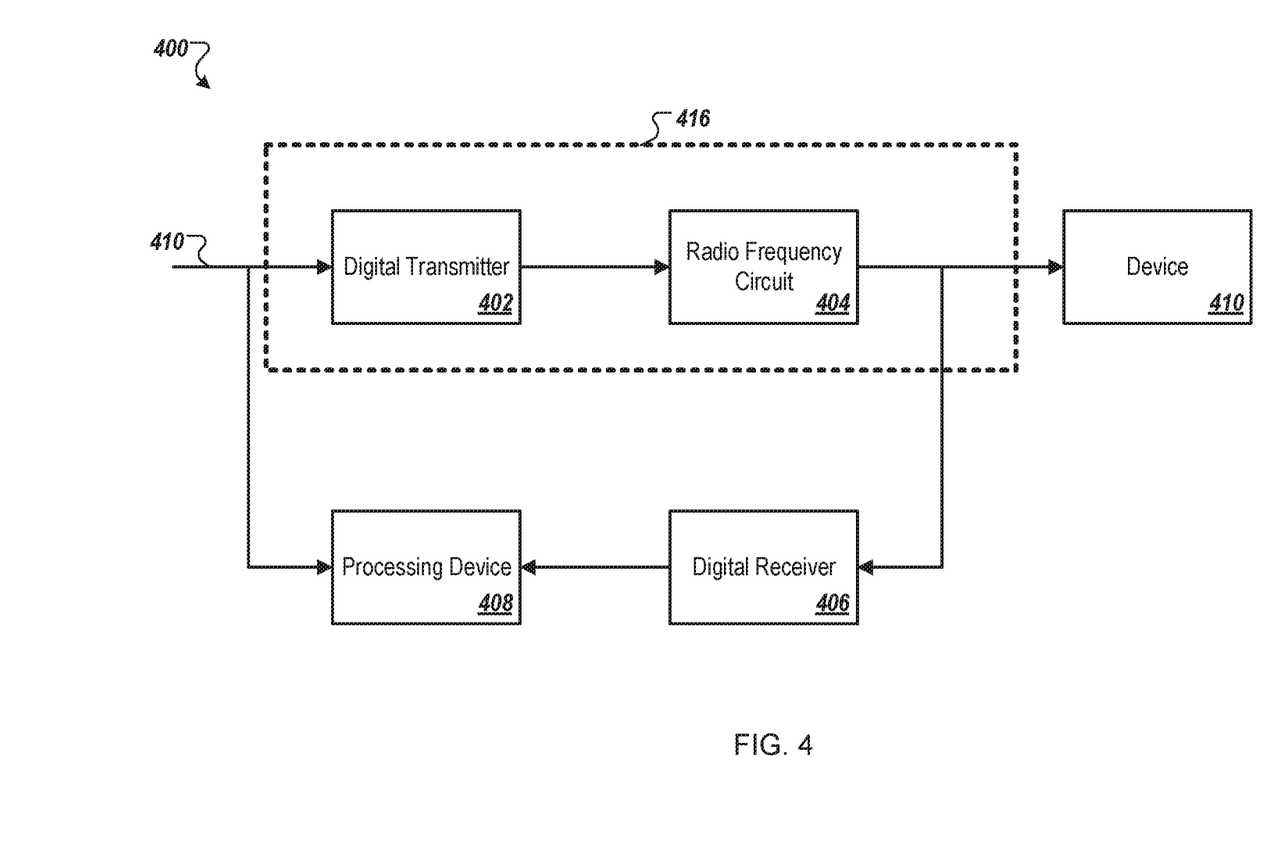
FIG. 4 illustrates a block diagram of an example system operable to perform beamforming.

FIG. 4 illustrates a block diagram of an example communication system 400 operable for beamforming estimation and actuation, in accordance with at least one example described in the present disclosure. The communication system 400 may include a digital transmitter 402, a radio frequency circuit 404, a device 410, a digital receiver 406, and a processing device 408. The digital receiver 406 and the processing device may be operable to receive a baseband signal via connection 410. A transceiver 416 may include the digital transmitter 402 and the radio frequency circuit 404.

In some examples, the communication system 400 may include a system of devices that may be operable to communicate with one another via a wired or wireline connection. For example, a wired connection in the communication system 400 may include one or more Ethernet cables, one or more fiber-optic cables, and/or other similar wired communication mediums. Alternatively, or additionally, the communication system 400 may include a system of devices that may be operable to communicate via one or more wireless connections. For example, the communication system 400 may include one or more devices operable to transmit and/or receive radio waves, microwaves, ultrasonic waves, optical waves, electromagnetic induction, and/or similar wireless communications. Alternatively, or additionally, the communication system 400 may include combinations of wireless and/or wired connections. In these and other examples, the communication system 400 may include one or more devices that may be operable to obtain a baseband signal, perform one or more operations to the baseband signal to generate a modified baseband signal, and transmit the modified baseband signal, such as to one or more loads.

In some examples, the communication system 400 may include one or more communication channels that may communicatively couple systems and/or devices included in the communication system 400. For example, the transceiver 416 may be communicatively coupled to the device 410.

In some examples, the transceiver 416 may be operable to obtain a baseband signal. For example, as described herein, the transceiver 416 may be operable to generate a baseband signal and/or receive a baseband signal from another device. In some examples, the transceiver 416 may be operable to transmit the baseband signal. For example, upon obtaining the baseband signal, the transceiver 416 may be operable to transmit the baseband signal to a separate device, such as the device 410. Alternatively, or additionally, the transceiver 416 may be operable to modify, condition, and/or transform the baseband signal in advance of transmitting the baseband signal. For example, the transceiver 416 may include a quadrature up-converter and/or a digital to analog converter (DAC) that may be operable to modify the baseband signal. Alternatively, or additionally, the transceiver 416 may include a direct radio frequency (RF) sampling converter that may be operable to modify the baseband signal.

In some examples, the digital transmitter 402 may be operable to obtain a baseband signal via connection 410. In some examples, the digital transmitter 402 may be operable to up-convert the baseband signal. For example, the digital transmitter 402 may include a quadrature up-converter to apply to the baseband signal. In some examples, the digital transmitter 402 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 402.

In some examples, the transceiver 416 may include one or more subcomponents that may be used in preparing the baseband signal and/or transmitting the baseband signal. For example, the transceiver 416 may include an RF front end (e.g., in a wireless environment) which may include a power amplifier (PA), a digital transmitter (e.g., 402), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some examples, a radio (e.g., a radio frequency circuit 404) of the transceiver 416 may be synchronized with the resource controller via the S-plane device, which may contribute to high-accuracy timing with respect to a reference clock.

In some examples, the transceiver 416 may be operable to obtain the baseband signal for transmission. For example, the transceiver 416 may receive the baseband signal from a separate device, such as a signal generator. For example, the baseband signal may come from a transducer operable to convert a variable into an electrical signal, such as an audio signal output of a microphone picking up a speaker's voice. Alternatively, or additionally, the transceiver 416 may be operable to generate a baseband signal for transmission. In these and other examples, the transceiver 416 may be operable to transmit the baseband signal to another device, such as the device 410.

In some examples, the device 410 may be operable to receive a transmission from the transceiver 416. For example, the transceiver 416 may be operable to transmit a baseband signal to the device 410.

In some examples, the radio frequency circuit 404 may be operable to transmit the digital signal received from the digital transmitter 402. In some examples, the radio frequency circuit 404 may be operable to transmit the digital signal to the device 410 and/or the digital receiver 406. In some examples, the digital receiver 418 may be operable to receive a digital signal from the RF circuit and/or send a digital signal to the processing device 408.

In some examples, the processing device 408 may be a standalone device or system, as illustrated. Alternatively, or additionally, the processing device 408 may be a component of another device and/or system. For example, in some examples, the processing device 408 may be included in the transceiver 416. In instances in which the processing device 408 is a standalone device or system, the processing device 408 may be operable to communicate with additional devices and/or systems remote from the processing device 408, such as the transceiver 416 and/or the device 410. For example, the processing device 408 may be operable to send and/or receive transmissions from the transceiver 416 and/or the device 410. In some examples, the processing device 408 may be combined with other elements of the communication system 400.

Figure 5:
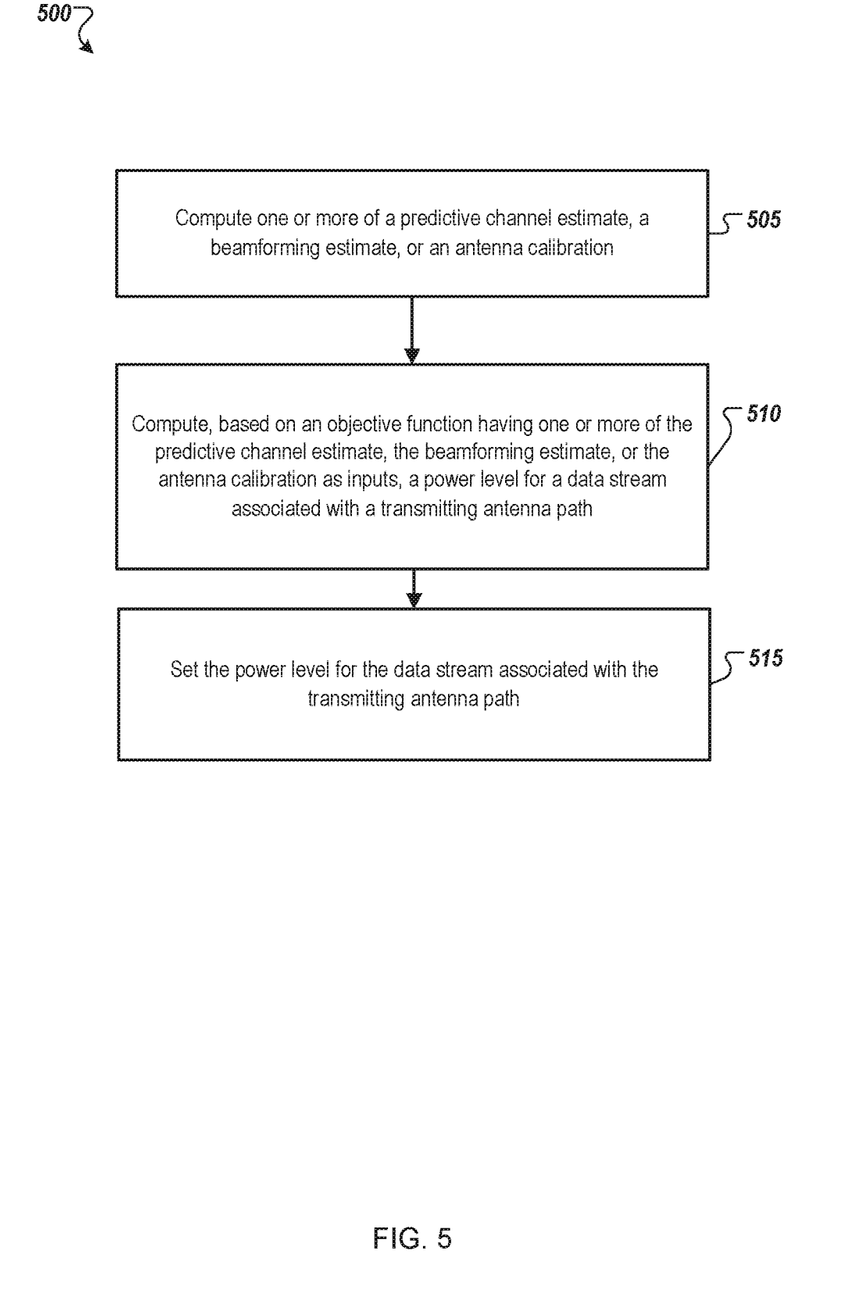
FIG. 5 illustrates a process flow of an example method of beamforming.

FIG. 5 illustrates a process flow of an example method 500 of beamforming actuation, in accordance with at least one example described in the present disclosure. The method 500 may be arranged in accordance with at least one example described in the present disclosure.

Figure 7:
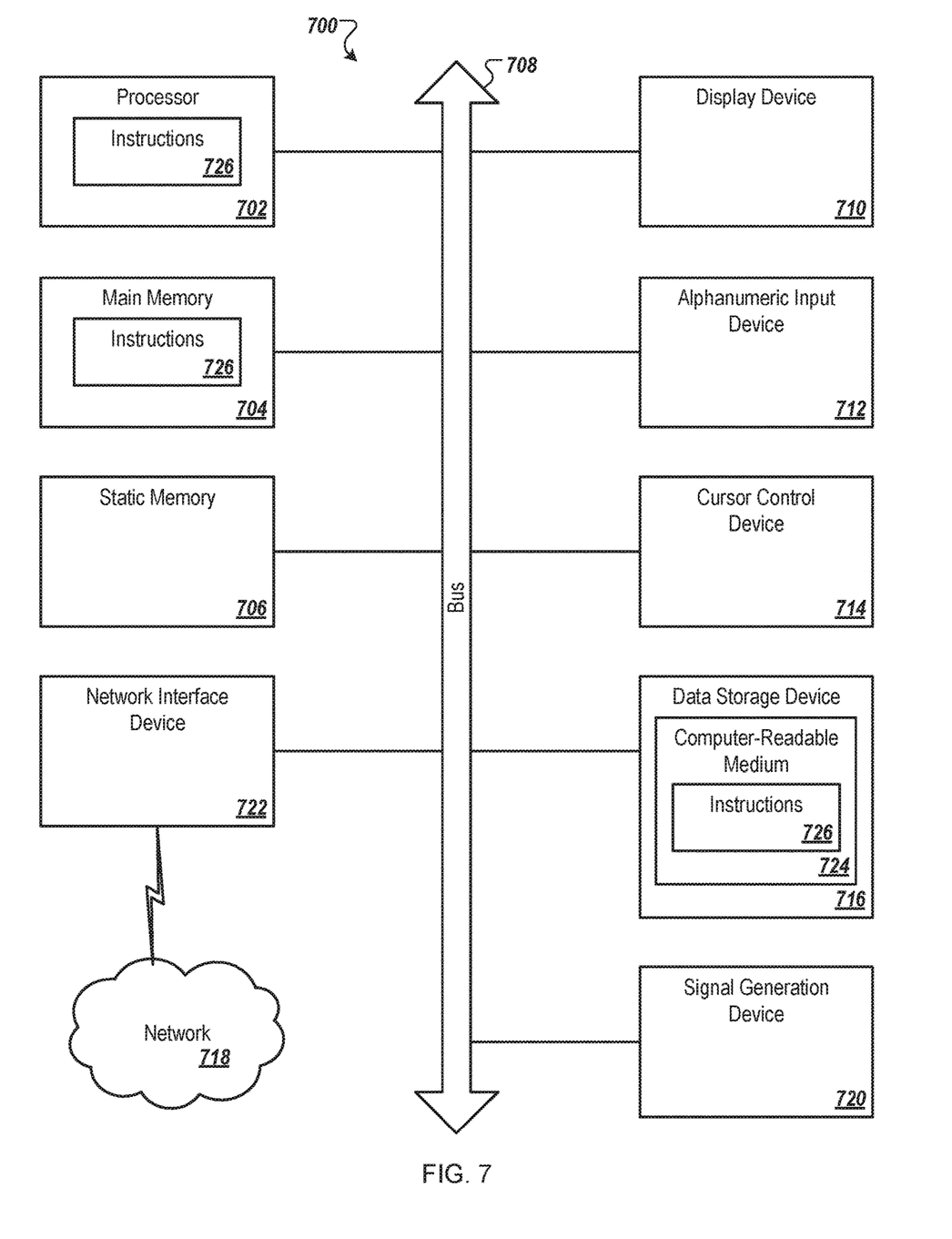
FIG. 7 illustrates an example computing system that may be used for beamforming, all arranged in accordance with some examples of the present disclosure.

The method 500 may be performed by processing logic that may include hardware (circuitry, dedicated logic, etc.), software (such as is run on a computer system or a dedicated machine), or a combination of both, which processing logic may be included in the processing device 408 of FIG. 4, the communication device 700 of FIG. 7, or another device, combination of devices, or systems.

The method 500 may begin at block 505 where the processing logic may compute one or more of a predictive channel estimate, a beamforming estimate, or an antenna calibration.

At block 510, the processing logic may compute, based on an objective function having one or more of the predictive channel estimate, the beamforming estimate, or the antenna calibration as inputs, a power level for a data stream associated with a transmitting antenna path, wherein the power level for the data stream is selected to facilitate an equal-power distribution across a plurality of transmitting antenna paths.

At block 515, the processing logic may set the power level for the data stream associated with the transmitting antenna path.

Modifications, additions, or omissions may be made to the method 500 without departing from the scope of the present disclosure. For example, in some examples, the method 500 may include any number of other components that may not be explicitly illustrated or described.

Figure 6:
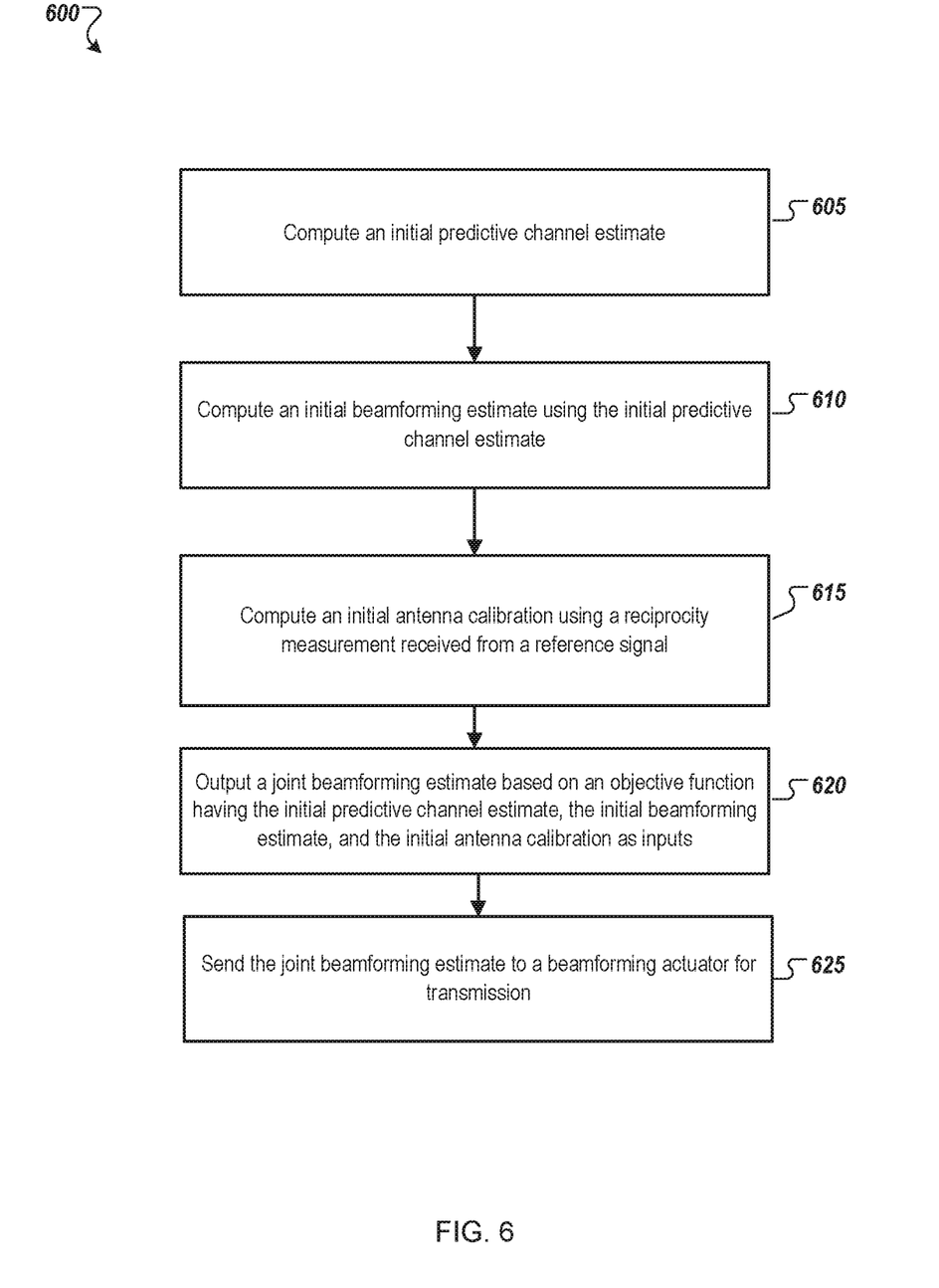
FIG. 6 illustrates a process flow of another example method of beamforming.

FIG. 6 illustrates a process flow of an example method 600 of functionality for a massive multiple-input multiple-output (mMIMO) system comprising an open radio access network radio unit (O-RU), in accordance with at least one example described in the present disclosure. The method 600 may be arranged in accordance with at least one example described in the present disclosure.

The method 600 may be performed by processing logic that may include hardware (circuitry, dedicated logic, etc.), software (such as is run on a computer system or a dedicated machine), or a combination of both, which processing logic may be included in the processing device 408 of FIG. 4, the communication device 700 of FIG. 7, or another device, combination of devices, or systems.

The method 600 may begin at block 605 where the processing logic may compute an initial predictive channel estimate.

At block 610, the processing logic may compute an initial beamforming estimate using the initial predictive channel estimate.

At block 615, the processing logic may compute an initial antenna calibration using a reciprocity measurement received from a reference signal.

At block 620, the processing logic may output a joint beamforming estimate based on an objective function having the initial predictive channel estimate, the initial beamforming estimate, and the initial antenna calibration as inputs.

At block 625, the processing logic may send the joint beamforming estimate to a beamforming actuator for transmission.

Modifications, additions, or omissions may be made to the method 600 without departing from the scope of the present disclosure. For example, in some examples, the method 600 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 7 illustrates a diagrammatic representation of a machine in the example form of a computing device 700 within which a set of instructions, for causing the machine to perform any one or more of the methods discussed herein, may be executed. The computing device 700 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is operable to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In at least one example, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 724 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Some portions of the detailed description refer to different modules operable to perform operations. One or more of the modules may include code and routines operable to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be operable to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of operable operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A massive multiple-input multiple-output (mMIMO) system operable for beamforming actuation comprising an open radio access network radio unit (O-RU) having a processing device operable to:
    compute one or more of a predictive channel estimate, a beamforming estimate, or an antenna calibration;
    compute, based on an objective function having one or more of the predictive channel estimate, the beamforming estimate, or the antenna calibration as inputs, a power level for a data stream associated with a transmitting antenna path, wherein the power level for the data stream is selected to facilitate an equal-power distribution across a plurality of transmitting antenna paths; and
    set the power level for the data stream associated with the transmitting antenna path.

2. The mMIMO system of claim 1, wherein the processing device is further operable to compute the power level using iteration.

3. The mMIMO system of claim 1, wherein the predictive channel estimate is computed using data compression to reduce data bandwidth below a data bandwidth threshold and reduce signal processing time below a signal processing time threshold.

4. The mMIMO system of claim 1, wherein processing device is further operable to compute the antenna calibration, wherein the antenna calibration is computed using a reciprocity measurement received from a reference signal.

5. The mMIMO system of claim 4, wherein the reference signal is a sounding reference signal (SRS).

6. The mMIMO system of claim 1, wherein the processing device is further operable to compute the predictive channel estimate and the beamforming estimate, wherein the beamforming estimate is based on the predictive channel estimate and the predictive channel estimate is compressed before computing the beamforming estimate.

7. The mMIMO system of claim 1, wherein the transmitting antenna path comprises one or more of:
    a LowPHY layer,
    a digital front end (DFE),
    a digital pre-distortion (DPD) component,
    a transmitting antenna,
    a radio frequency front end (RFFE), or
    a power amplifier (PA).

8. The mMIMO system of claim 1, wherein the transmitting antenna path has a power efficiency greater than a power efficiency threshold.

9. The mMIMO system of claim 1, wherein the plurality of transmitting antenna paths have a total power efficiency greater than a total power efficiency threshold.

10. The mMIMO system of claim 1, wherein the mMIMO system comprises an open radio access network distributed unit (O-DU) that is split from the O-RU based on an O-RU 6 split or an O-RU 7 split.

11. The mMIMO system of claim 1, wherein the mMIMO system comprises an open radio access network distributed unit (O-DU) that is split from the O-RU based on an O-RAN 7.2 split.

12. The mMIMO system of claim 11, wherein the O-RAN 7-2 split is an O-RAN 7.2C split.

* * * * *